United States Patent
Yang et al.

(10) Patent No.: US 10,762,799 B1
(45) Date of Patent: Sep. 1, 2020

(54) MAKE-UP ASSISTING METHOD IMPLEMENTED BY MAKE-UP ASSISTING DEVICE

(71) Applicant: CAL-COMP BIG DATA, INC., New Taipei (TW)

(72) Inventors: Ren-Jie Yang, New Taipei (TW); Min-Chang Chi, New Taipei (TW); Shyh-Yong Shen, New Taipei (TW)

(73) Assignee: CAL-COMP BIG DATA, INC., New Taipei (TW)

(*) Notice: Subject to any disclaimer, the term of this patent is extended or adjusted under 35 U.S.C. 154(b) by 0 days.

(21) Appl. No.: 16/525,577

(22) Filed: Jul. 30, 2019

(30) Foreign Application Priority Data

Mar. 29, 2019 (TW) .............................. 108111344 A

(51) Int. Cl.
  *H04N 5/77* (2006.01)
  *G09B 5/02* (2006.01)
  (Continued)

(52) U.S. Cl.
  CPC .............. *G09B 5/02* (2013.01); *A45D 44/005* (2013.01); *G06K 9/00255* (2013.01);
  (Continued)

(58) Field of Classification Search
  CPC ... H04N 5/23293; G06F 9/453; G06F 3/0481; G06F 3/1454; H04M 2250/16
  (Continued)

(56) References Cited

U.S. PATENT DOCUMENTS 9,812,030 B2 * 11/2017 Yamanashi .......... A45D 44/005
2002/0196333 A1  12/2002 Gorischek

FOREIGN PATENT DOCUMENTS

CN  106021704 A  10/2016
CN  107692701 A   2/2018
(Continued)

OTHER PUBLICATIONS

Office Action dated Mar. 6, 2020 of the corresponding Taiwan patent application.
(Continued)

*Primary Examiner* — Robert Chevalier
(74) *Attorney, Agent, or Firm* — Chun-Ming Shih; HDLS IPR Services

(57) ABSTRACT

A make-up assisting method implemented by a make-up assisting device is disclosed, wherein the make-up assisting device (1) has a reflecting mirror (11), an image capturing unit (13) and a display unit (12) arranged behind the reflecting mirror (11). The make-up assisting method includes steps of: reflecting user's face image (110) through the reflecting mirror (11) and controlling the image capturing unit (13) to execute an image recording procedure toward the user when the make-up assisting device (1) enters a make-up assisting mode; obtaining video content information (162) corresponding to user's current make-up procedure; displaying the video content information (162) on a first assisting interface (121) of the display unit (12), wherein the first assisting interface (121) does not overlap with the face image; and, terminating the image recording procedure to generate a recorded video (163) when the make-up procedure is completed.

13 Claims, 10 Drawing Sheets

(51) Int. Cl.
*G11B 27/34* (2006.01)
*G11B 27/30* (2006.01)
*H04N 5/272* (2006.01)
*A45D 44/00* (2006.01)
*G06K 9/00* (2006.01)
*H04N 5/775* (2006.01)
*H04L 29/08* (2006.01)

(52) U.S. Cl.
CPC .............. *G11B 27/30* (2013.01); *G11B 27/34* (2013.01); *H04N 5/272* (2013.01); *H04N 5/77* (2013.01); *H04L 67/10* (2013.01)

(58) Field of Classification Search
USPC ....... 386/228, 227, 230, 231, 326, 278, 224, 386/210
See application file for complete search history.

(56) References Cited

FOREIGN PATENT DOCUMENTS

| | | |
|---|---|---|
| CN | 108171143 A | 6/2018 |
| EP | 1975870 A1 | 10/2008 |
| EP | 3404577 A1 | 11/2018 |
| EP | 3457318 A1 | 3/2019 |
| TW | 200519868 A | 6/2005 |

OTHER PUBLICATIONS

Search Report dated Sep. 27, 2019 of the corresponding European patent application.

\* cited by examiner

MAKE-UP ASSISTING METHOD IMPLEMENTED BY MAKE-UP ASSISTING DEVICE

BACKGROUND OF THE INVENTION

1. Technical Field

The technical field relates to make-up field, especially to make-up assisting method to facilitate the make-up procedure for user.

2. Description of Related Art

For most female, make-up is everyday practice.

In early time, the user usually sits in front of mirror while putting on make-up, or uses the camera/display of the smart phone, the panel computer or other electronic equipment as mirror while putting on make-up.

Recently there is an assisting device to facilitate user for putting on make-up. This assisting device can provide various assisting services such as playing back make-up tutoring film, providing cosmetic-related information or providing make-up guide. Through the help of the assisting device, the inexperienced or unskilled user can also achieve good make-up effect.

However, the above-mentioned assisting device has complicated operation, where user needs to switch to different display pages or different function modes to enquire and use the different information and function provided by the assisting device. In the stage of actually putting on the make-up, user still needs to perform the make-up process alone in front the mirror (for example, user first watches the instruction video (film) in video mode and then switches the assisting device to mirror mode to put on make-up). This is still not convenient for part of the users.

SUMMARY OF THE INVENTION

The disclosure is directed to a make-up assisting method implemented by a make-up assisting device. The method displays make-up reference information for user to conduct make-up procedure and the make-up reference information does not overlap with face image of the user, thus facilitate the user to speed up make-up procedure.

One of the exemplary embodiments, the make-up assisting method is implemented by a make-up assisting device, where the make-up assisting device comprises at least a reflecting mirror, an image capturing unit, a display unit arranged behind the reflecting mirror. The make-up assisting method comprises following steps. The reflecting mirror directly reflects a face image of a user when the make-up assisting device enters a make-up assisting mode. A processor obtains a video content information from a storage unit. The display unit provides a first assisting interface on a portion of the display unit and the processor controls the display unit to display the video content information on the first assisting interface, wherein the first assisting interface does not overlap with the face image.

According to the present disclosure, the make-up assisting device may use the display unit to display the make-up information useful to the make-up procedure of the user on the reflecting mirror besides reflecting user image on the reflecting mirror when the user uses the reflecting mirror of the make-up assisting device to execute the make-up procedure. Therefore, the user can watch her/his face image and the make-up information useful to the make-up procedure at the same time to enhance the speed and accuracy of the make-up procedure.

BRIEF DESCRIPTION OF DRAWINGS

The present disclosure can be more fully understood by reading the following detailed description of the examples, with reference made to the accompanying drawings as follows.

DETAILED DESCRIPTION OF THE INVENTION

Figure 1:
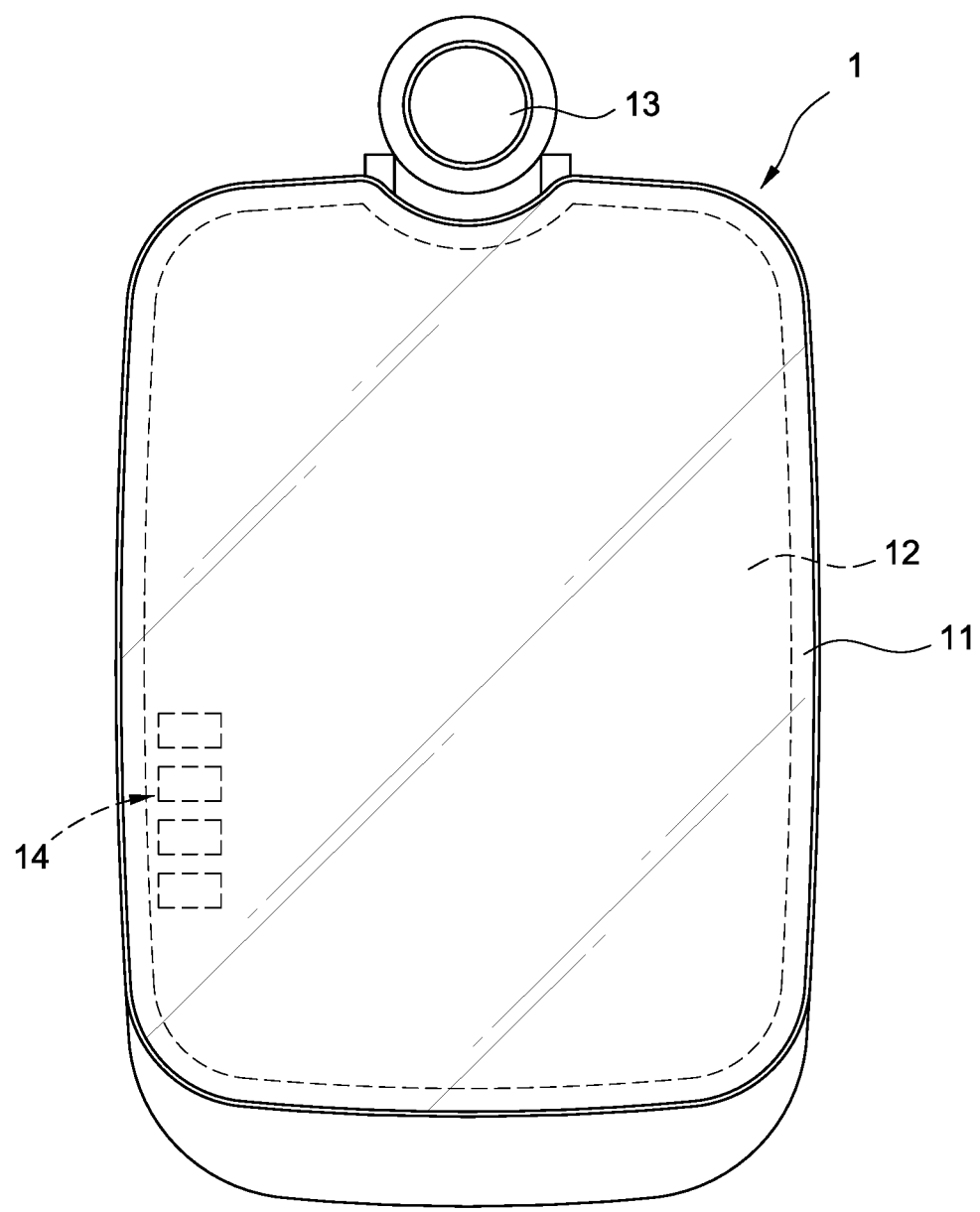
FIG. 1 shows the schematic view of the make-up assisting device according to the first example of the present disclosure.

Reference will now be made to the drawing figures to describe the present disclosure in detail. It will be understood that the drawing figures and exemplified example of present disclosure are not limited to the details thereof.

As shown in FIG. 1, this figure shows the schematic view of the make-up assisting device according to the first example of the present disclosure. The present disclosure discloses a make-up assisting method implemented by the make-up assisting device 1 shown in FIG. 1.

As shown in FIG. 1, the make-up assisting device 1 mainly comprises a reflecting mirror 11, a display unit 12 arranged behind the reflecting mirror 11, an image capturing unit 13 arranged on a side of the reflecting mirror 11, and an input unit 14 arranged on another side of the input unit 14. According to a disclosed example, the input unit 14 may be physical keys. According to another disclosed example, the input unit 14 may be touch keys. According to still another disclosed example, the display 12 may be touch panel on which user may directly input command; therefore, the input unit 14 may be dispensed with in this disclosed example.

It should be noted that in the present disclosure, the display unit 12 is mainly arranged behind the reflecting mirror 11. When the display unit 12 is turned off or the brightness thereof is smaller than a predetermined threshold, the user cannot see the displayed content of the display unit 12 by naked eyes. The reflecting mirror 11 can directly reflect user image in front of the make-up assisting device 1. When the display unit 12 is turned on or the brightness thereof is larger than the predetermined threshold, the displayed content can pass the reflecting mirror 11 such that user can directly view the displayed content of the display unit 12 by viewing the reflecting mirror 11.

In this example, the size of the display unit 12 is equal to or smaller than the size of the reflecting mirror 11, and the display unit 12 may adjust the size and position of the display area thereof. Therefore, user may use the reflecting mirror 11 to reflect her/his image and at the same time check the displayed content of the display unit 12 (such as those shown in FIGS. 5 to 7). Therefore, the make-up procedure of the user can be facilitated.

Figure 2:
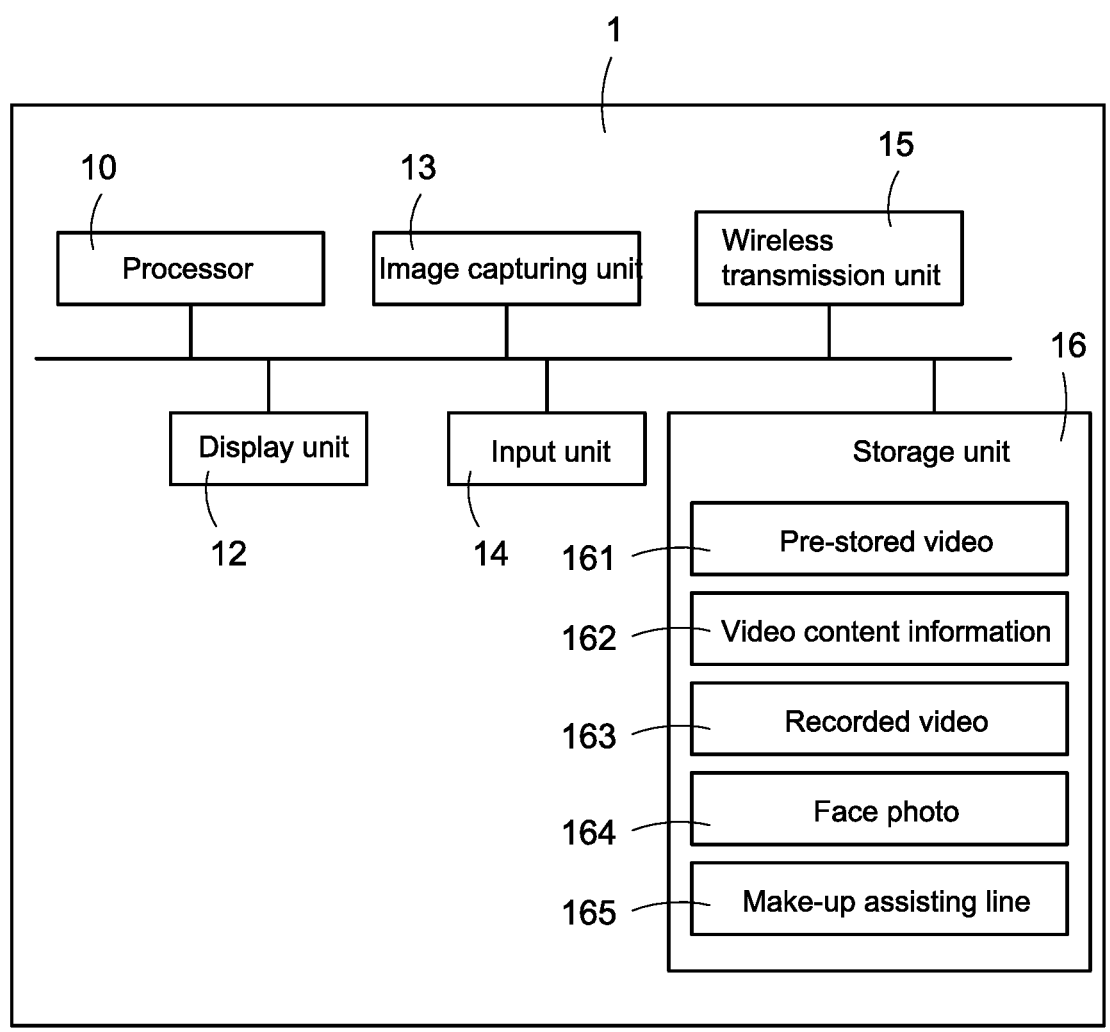
FIG. 2 shows the block diagram of the make-up assisting device according to the first example of the present disclosure.

FIG. 2 shows the block diagram of the make-up assisting device 1 according to the first example. As shown in FIG. 2, the make-up assisting device 1 mainly comprises a processor 10, the display unit 12, the image capturing unit 13, the input unit 14, a wireless transmission unit 15 and a storage unit 16. The processor 10 is electrically connected to the display unit 12, the image capturing unit 13, the input unit 14, the wireless transmission unit 15 and the storage unit 16 through bus.

According to an example, the storage unit 16 stores a plurality of pre-stored videos 161 and video content information 162 respectively corresponding to each of the pre-stored videos 161. The processor 10 may receive user operation (such as operation on the input unit 14 or touch panel) to play back the user-selected pre-stored video 161 and/or to display the video content information 162 corresponding to the user-selected pre-stored video 161 on the display unit 12.

In this example, the pre-stored videos 161 are, for example but not limited to, make-up instruction video and the video content information 162 is, for example but not limited to, static image (such as picture, photo or AR image) to introduce the make-up appearance (make-up face) in the pre-stored video 161, information of cosmetic related to the make-up to be put on and so on.

According to an example, the processor 10 controls the image capturing unit 13 to record (film) the make-up procedure of the user and to generate and save the recorded video 163 in the storage unit 16. Therefore, the user may collect, arrange, classify, edit and browse the past maker-up record to enhance the make-up skill.

According to an example, the make-up assisting device 1 uses the wireless transmission unit 15 to connect to a network (such as Internet) such that the user may share her/his recorded video 163 to major social websites. According to another example, the make-up assisting device 1 may provide a cloud platform (not shown), and the processor 10 may upload the recorded video 163 to the cloud platform to share the make-up video after the recorded video 163 is finished and the processor 10 gets upload instruction from user.

Figure 3A:
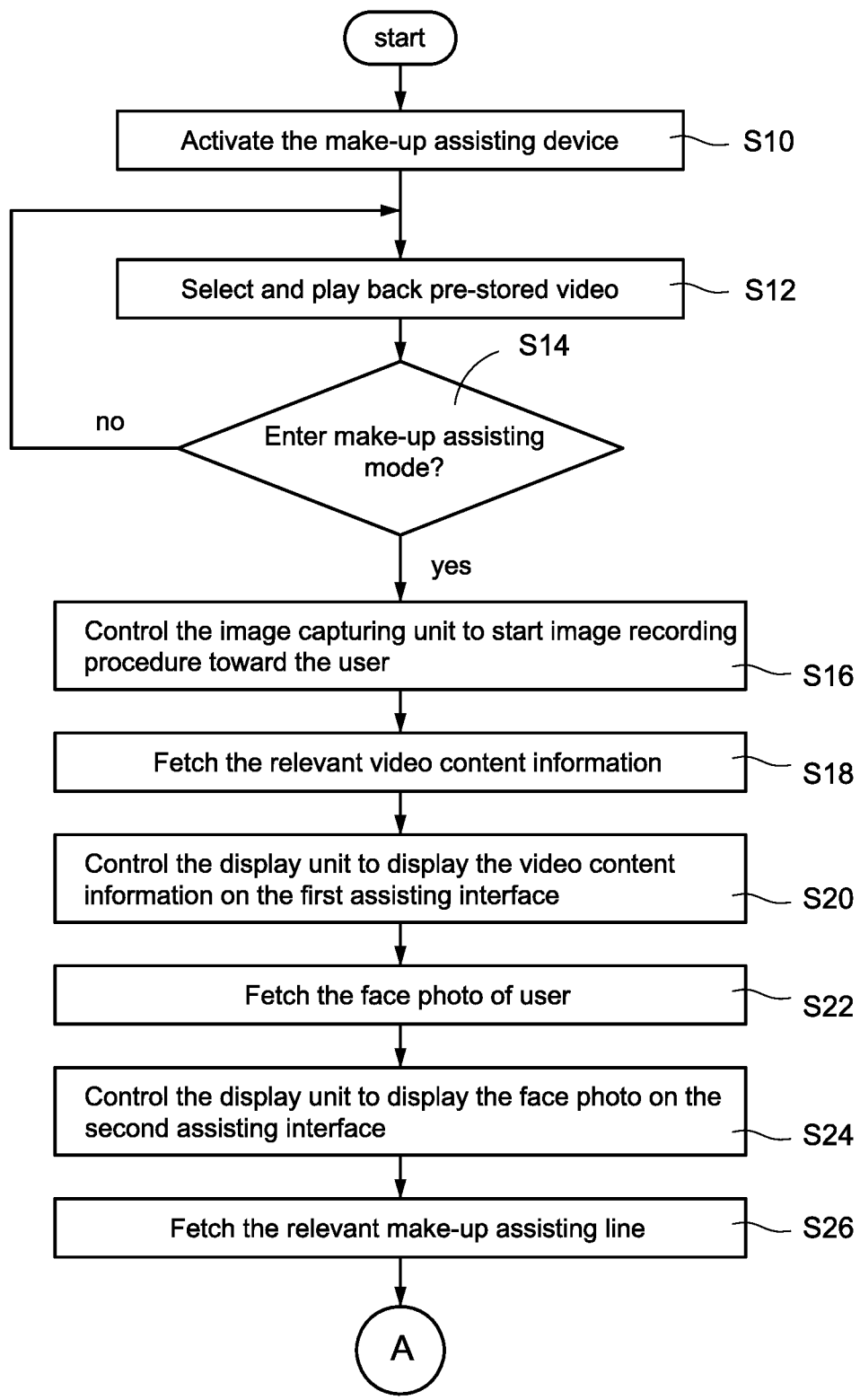
FIG. 3A shows the first flowchart of the make-up assisting method according to the first example.
Figure 3B:
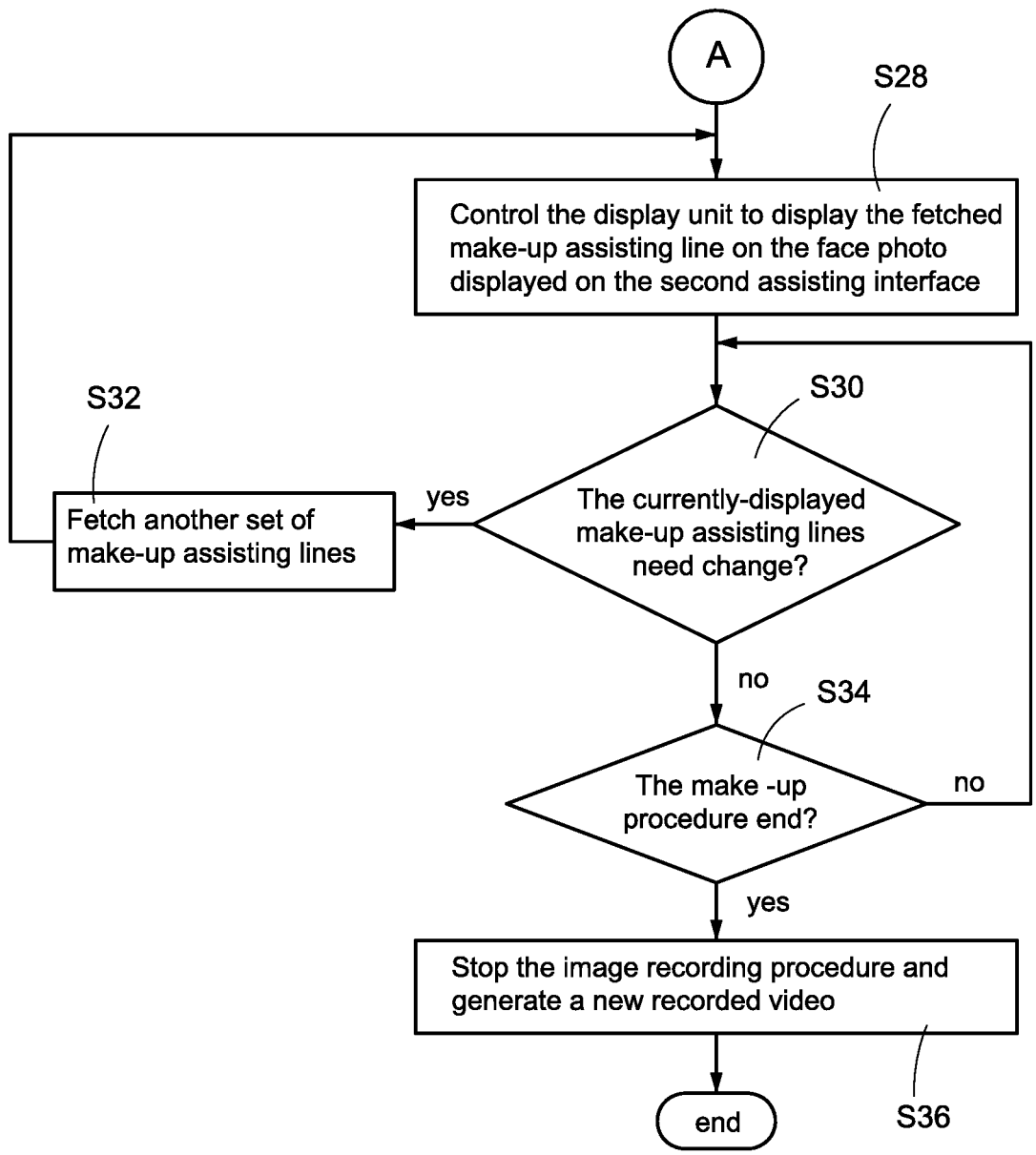
FIG. 3B shows the second flowchart of the make-up assisting method according to the first example.

With reference to FIGS. 3A and 3B, those figures respectively show the first flowchart and the second flowchart of the make-up assisting method. The steps shown in FIGS. 3A and 3B corresponding to the make-up assisting method and may be executed through the make-up assisting device 1 shown in FIG. 1 or FIG. 2.

As shown in FIGS. 3A and 3B, at first the user activates the make-up assisting device 1 (step S10). In this disclosure, the make-up assisting device 1 at least has a video-browsing mode. Under the video-browsing mode, the user may use the input unit 14 or touch panel to select and play back one or more pre-stored video 161 in the storage unit 16 (step S12).

More particularly, the pre-stored video 161 may be make-up instruction video of famous make-up artist, make-up appearance introduction video and so on. The user may input key word according her/his need to search the required pre-stored video 161 in the storage unit 16 and the required pre-stored video 161 is played back on the display unit 12. For example, the user may use key word to search the make-up instruction video of famous make-up artist of her/his interest, the instruction video for the make-up to be put on and the introduction video for the make-up suitable for the occasion to be attended and so on.

During the operation of user, the processor 10 continually determines whether the user controls the make-up assisting device 1 to enter a make-up assisting mode (step S14), namely, the processor 10 continually determines whether the user ends watching the pre-stored video 161 and is going to start the make-up procedure. The processor 10 continually plays back the user-selected pre-stored video 161 in the video-browsing mode if the make-up assisting mode is not entered in the step S14.

Besides, the processor 10 activates the image capturing unit 13 and controls the image capturing unit 13 to face toward user and to start image recording procedure for the user (step S16) if the make-up assisting mode is entered in the step S14. One of technique features of the present disclosure is that by activating the image capturing unit 13, the make-up assisting device 1 may help user to record the make-up procedure of the user into video (film) to facilitate the user to browse, edit and share the recorded video 163 after the make-up procedure, thus enhance her/his make-up skill.

It should be noted that the user may sit in front of the make-up assisting device 1 (the make-up assisting device 1 may stand on desktop or hang on wall) and the reflecting mirror 11 of the make-up assisting device 1 may directly reflect the image of user face. In this example, the image capturing unit 13 mainly captures the image along the reflection direction of the reflecting mirror 11 to completely record the change of user face during the make-up procedure. However, the above description is only one example of the present disclosure. In other example, the image capturing unit 13 may capture the image of entire user body, and the scope of the present disclosure is not limited by the above example.

After the step S16, the processor 10 further fetches (obtains) the video content information 162 relevant to the user make-up procedure from the storage unit 16 (step S18) and displays the video content information 162 on the display unit 12.

According to one example, the storage unit 16 already stores a plurality of video content information 162 and each of the video content information 162 is corresponding to one or more pre-stored video 161. In this example, the video content information 162 may be corresponding to the image of the make-up appearance demonstrated in the pre-stored video 161, or information of one or more cosmetic related to the make-up to be put on. In other word, the user may check the image of the make-up to be put on and/or cosmetic related to the make-up to be put on with the display unit 16 besides watching her/his image through the reflecting mirror 11 when the user operates the make-up assisting device 1 to enter the make-up assisting mode.

In other example, the video content information 162 may be the complete pre-stored video 161 to facilitate the user to perform the make-up procedure while watching the pre-stored video 161. For the sake of clear description, the video content information 162 is exemplified with static image to show the make-up appearance (namely the video content information 162 only contains the image of the make-up appearance) for the following description.

In this example, the display unit 12 may provide a first assisting interface 121 on one portion of the reflecting mirror 11 (such as the reflecting mirror 11 shown in FIG. 5) when the make-up assisting device 1 enters the make-up assisting mode and the processor 10 may control the display unit 12 to display the video content information 162 on the first assisting interface 121 (step S20). Therefore, the user may check the video content information 162 relevant to the make-up to be put on through the first assisting interface 121 of the display unit 12 while the user checks her face image reflected from the reflecting mirror 11 at the same time, thus facilitate the make-up procedure.

Figure 5:
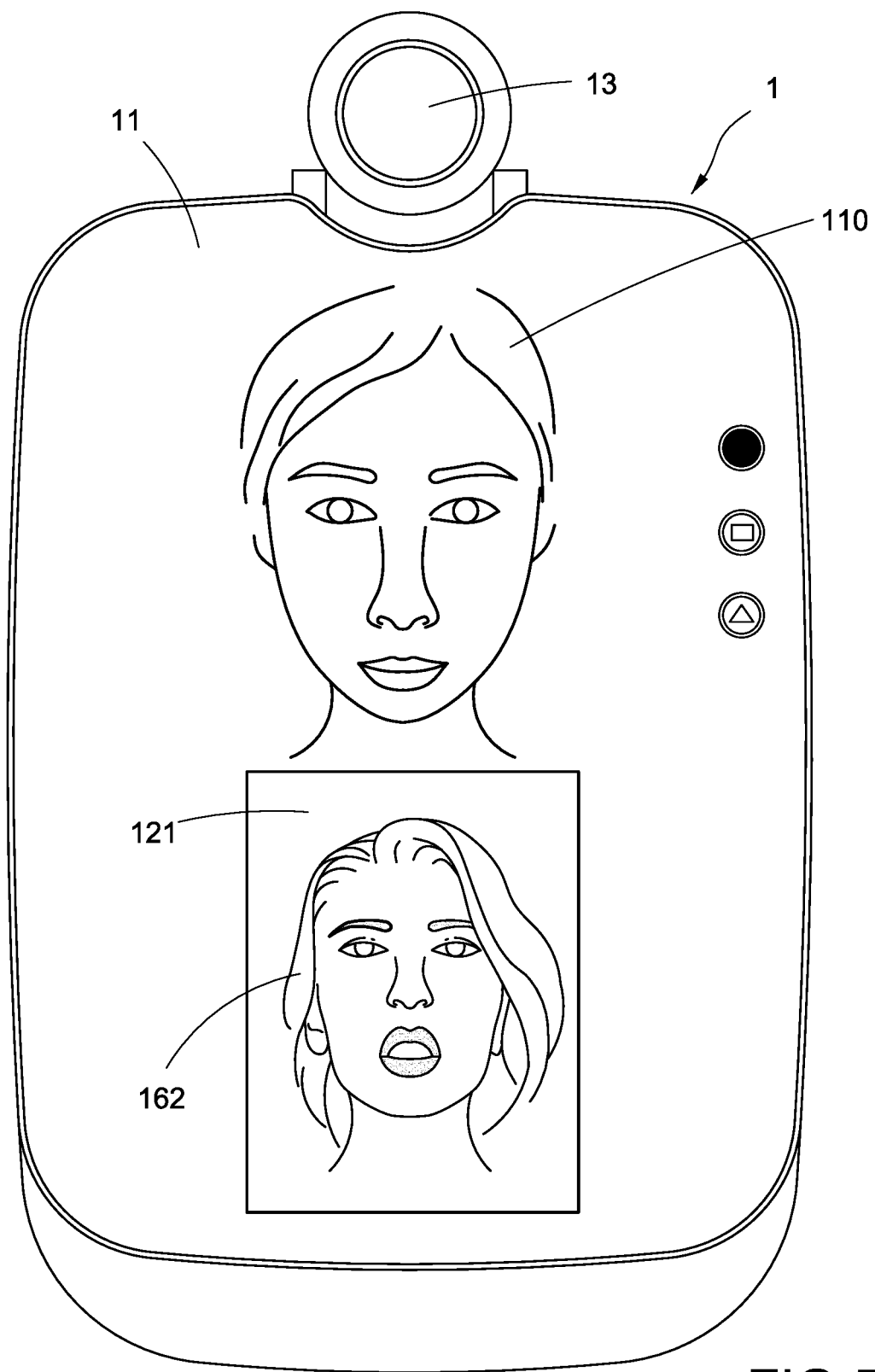
FIG. 5 is a schematic view showing the make-up interface according to the second example.

It should be noted that, to not bother the make-up of user, the processor 12 controls the display unit 12 such that the position (area) of the first assisting interface 121 does not overlap with the face image reflected by the reflecting mirror 11 as shown in FIG. 5. In the example shown in FIG. 5, the first assisting interface 121 is, for example, arranged at lower portion of the display unit 12. However, the above example is not limitation of the present disclosure.

In this example, the pre-stored videos 161 in the storage unit 16 respectively has at least one content mark (not shown) and each of the video content information 162 has a corresponding content mark. In the above step S18, the processor 10 mainly fetches the content mark for a specific pre-stored video 161 and then enquires the storage unit 16 based on the content mark. Therefore, the processor 10 may fetch the video content information 162 corresponding to the specific pre-stored video 161. In other word, the video content information 162 (such as cosmetic product information, static image, or dynamic video and so on) displayed on the first assisting interface 121 is surely relevant to the specific pre-stored video 161.

In one example, the user may select the specific pre-stored video 161 from the storage unit 16 by herself such that the processor 10 obtains the corresponding video content information 162 from the content mark of the selected specific pre-stored video 161 and displays the video content information 162 on the first assisting interface 121 of the display unit 12. In another example, the user may directly select a specific video content information 162 from the storage unit 16 for her reference such that the processor 10 may directly control the display unit 12 to display the selected specific video content information 162 on the first assisting interface 121.

In still another example, if the user switches the make-up assisting device 1 from the video-browsing mode to the make-up assisting mode, the processor 10 may directly obtain the content mark of the last played-back pre-stored video 161 before the make-up assisting device 1 enters the make-up assisting mode and then obtain the video content information 162 corresponding to the content mark. However, above examples are only for demonstration and not limitation of the present disclosure.

In the present disclosure, the make-up assisting device 1 may, according to the user operation, selectively provide one or more assisting interface (such as the first assisting interface 121 and the second assisting interface 122 shown in FIG. 7) on the display unit 12 and then display certain information based on user selection, which will be detailed later. If the user chooses to display only one assisting interface and to display the video content information 162 on this assisting interface, then the processor 10 may determine whether the make-up procedure of the user ends (step S34) after the above step S20, and stops the image recording procedure after the make-up procedure is over in order to generate a new recorded video 163 (step S36). In this example, the recorded video 163 is stored in the storage unit 16.

If the user chooses to display multiple assisting interfaces, the make-up assisting device 1 provides a second assisting interface (such as the second assisting interface 122 shown in FIG. 6) on another portion of the display unit 12 when the make-up assisting device 1 enters the make-up assisting mode. After the step S20, the processor 10 further fetches the face photo of user (such as the face photo 164 shown in FIG. 2) in step S22 and the processor 10 controls the display unit 12 to display the face photo 164 on the second assisting interface 122 (step S24). In this example, the position (area) of the second assisting interface 122 on the display unit 12 does not overlap with the position (area) of the first assisting interface 121 on the display unit 12, and does not overlap with the face image reflected by the reflecting mirror 11.

After the step S24, the processor 10 further fetches the relevant make-up assisting line 165 (such as the make-up assisting line 165 shown in FIG. 2) in step S26 and then controls the display unit 12 to display the fetched make-up assisting line 165 on the face photo 164 displayed on the second assisting interface 122 (step S28). In this disclosure, the above-mentioned make-up assisting line 165 is corresponding to a make-up region (such as eyebrow, eye, cheek, lip and so on) on user face. Therefore, the user may put on make-up on right position of her face by following the guidance of the make-up assisting line 165.

In the first example, the make-up assisting device 1 may request the user to take her face photo 164 through the image capturing unit 13 when the user first time uses the make-up assisting device 1 and registers her account, and then the make-up assisting device 1 stores the face photo 164 in the storage unit 16. Therefore, the processor 10 may perform image analysis on the face photo 164 in advance and generate a plurality sets of make-up assisting lines 165. The plurality sets of make-up assisting lines 165 may be stored in the storage unit 16 and each of the sets of make-up assisting lines 165 is corresponding to respective one of the make-up regions on the face photo 164.

In above first example, the processor 10 may identify each of the make-up regions on the face photo 164, such as eyebrow make-up region, eye make-up region, cheek make-up region (rouge), lip make-up region and so on by image analysis, and then perform calculation on the make-up regions by internal algorithm to generate a set of make-up assisting lines 165 corresponding to each of the make-up regions.

In above step S22, the processor 10 may directly read the face photo 164 taken in advance by user from the storage unit 16. In above step S26, the processor 10 may fetch and display the make-up assisting line 165 corresponding to user need. For example, the processor 10 may display the make-up assisting line 165 corresponding to eye make-up region on the face photo 164 of user if the user wants to put on eye make-up.

In the second example, in above step S22, the processor 10 may control the image capturing unit 13 to fetch user image in real time to generate the real-time face photo 164. In above step S26, the processor 10 may perform image analysis in real time to the face photo 164 fetched by the image capturing unit 13. By the calculation of algorithm in the processor 10, a set of make-up assisting lines 165 corresponding to each of the make-up regions on the face photo 164 may be generated.

However, above examples are only for demonstration and not limitation of the present disclosure.

As mentioned above, a face photo 164 has a plurality of make-up regions and the processor 10 uses internal algorithm to generate a set of make-up assisting lines 165 corresponding to each of the make-up regions on the face photo 164. In other word, the storage unit 16 stores a plurality sets of make-up assisting lines 165 corresponding to the face photo 164 besides storing the face photo 164 for the user. In above step S26, the make-up assisting device 1 may, upon receiving the user operation, select one set of make-up assisting lines 165 according to user desire and display the selected set of make-up assisting lines 165 on the face photo 164.

For example, if the user wants to put on cheek make-up (rouge), the user may perform selection on the make-up assisting device 1 by operating the input unit 14 or touch panel, thus select the make-up assisting lines 165 corresponding to the cheek make-up region (rouge) on the face photo 164. If the user wants to put on lipstick, the user may perform selection on the make-up assisting device 1 by operating the input unit 14 or touch panel, thus select the make-up assisting lines 165 corresponding to the lip make-up region on the face photo 164 and so on.

In another example, the above video content information 162 may be further set with a portion mark (not shown) for indicating a make-up region, and the processor 10 sets a corresponding portion mark to each set of the make-up assisting lines 165 based on the make-up region corresponding to each set of the make-up assisting lines 165. For example, if the content of the video content information 162 is a static image for a lip make-up, the portion mark can be recorded with "lip make up", "lip", "lipstick" or similar content. Similarly, if a set of make-up assisting lines 165 is corresponding to lip make-up region on the face photo 164 of the user, the processor 10 may set portion mark for the make-up assisting lines 165 with content such as "lip make up", "lip", "lipstick" or similar content.

As mentioned above, in above step S26, the processor 10 mainly first fetches the portion mark of the video content information 162 currently displayed on the first assisting interface 121, and then enquires the storage unit 16 based on the fetched portion mark such that the processor 10 fetches a set of make-up assisting lines 165 corresponding to the portion mark. By above technique, it ensures that the video content information 162 currently displayed on the first assisting interface 121 and the make-up assisting lines 165 displayed on the second assisting interface 122 indicate the same make-up region to facilitate the user make-up procedure.

After step S28, the processor 10 may further determine whether the currently-displayed make-up assisting lines 165 need change (step S30), namely, determine whether the current user-interested make-up region changes. If the processor 10 determines that the currently-displayed make-up assisting lines 165 need change in step S30, the processor 10 fetches another set of make-up assisting lines 165 from the storage unit 16 (step S32) and displays the another set of make-up assisting lines 165 on the face photo 164 currently displayed on the second assisting interface 122. The make-up region corresponding to another set of make-up assisting lines 165 is different with the make-up region corresponding to the set of make-up assisting lines 165 fetched in step S26.

In another example, the user may manually perform change operation for the make-up assisting device 1 by operating the input unit 14 or touch panel (such as pressing the key for page up or page down) to change the make-up assisting lines 165 currently displayed on the second assisting interface 122.

In another example, the user may perform change operation for the make-up assisting device 1 by operating the input unit 14 or touch panel to change the video content information 162 currently displayed on the first assisting interface 121. Therefore, the processor 10 may enquire the storage unit 16 based on the portion mark of the changed video content information 162 to fetch another set of make-up assisting lines 165 corresponding to the changed video content information 162.

In still another example, the video content information 162 displayed on the first assisting interface 121 by the make-up assisting device 1 is a video and the video contains introduction or instruction for different make-up regions of make-up face. In this example, the processor 10 may continually detect the currently-played content of the video content information 162 and dynamically change the make-up assisting lines 165 displayed on the second assisting interface 122 based on the displayed content of the video content information 162 (which will be detailed later) to enhance the user convenience by the auto-changing function.

In above description, the processor 10 first fetches the face photo 164 of the user, then fetches a set of make-up assisting lines 165 according to user requirement, and finally display the face photo 164 and the make-up assisting lines 165 overlapped with each other on the second assisting interface 122. In another example, the processor 10 may generate and store a plurality of auxiliary photos (not shown) based on a face photo 164 and multiple sets of make-up assisting lines 165. For example, the processor 10 may generate an auxiliary photo used for eyebrow make-up and augmented with make-up assisting lines for eyebrow make-up region, an auxiliary photo used for eye make-up and augmented with make-up assisting lines for eye make-up region, an auxiliary photo used for cheek make-up and augmented with make-up assisting lines for cheek make-up region, and an auxiliary photo used for lip make-up and augmented with make-up assisting lines for lip make-up region.

In above example, the processor 10 merges (integrates) the face photo 164 with multiple sets of make-up assisting lines 165 in advance such that, in above step S32, the processor 10 may change the corresponding auxiliary photo according to the actual need and display the changed auxiliary photo on the second assisting interface 122. By above technique, the performance of the make-up assisting device 1 can be enhanced because the processor 10 does not need to overlap the separate face photo 164 and the make-up assisting lines 165. Therefore, the performance of the make-up assisting device 1 is enhanced.

Please refer to FIGS. 4 to 7, which are schematic views showing the make-up interface according to the first to the fourth examples of the present disclosure.

Figure 4:
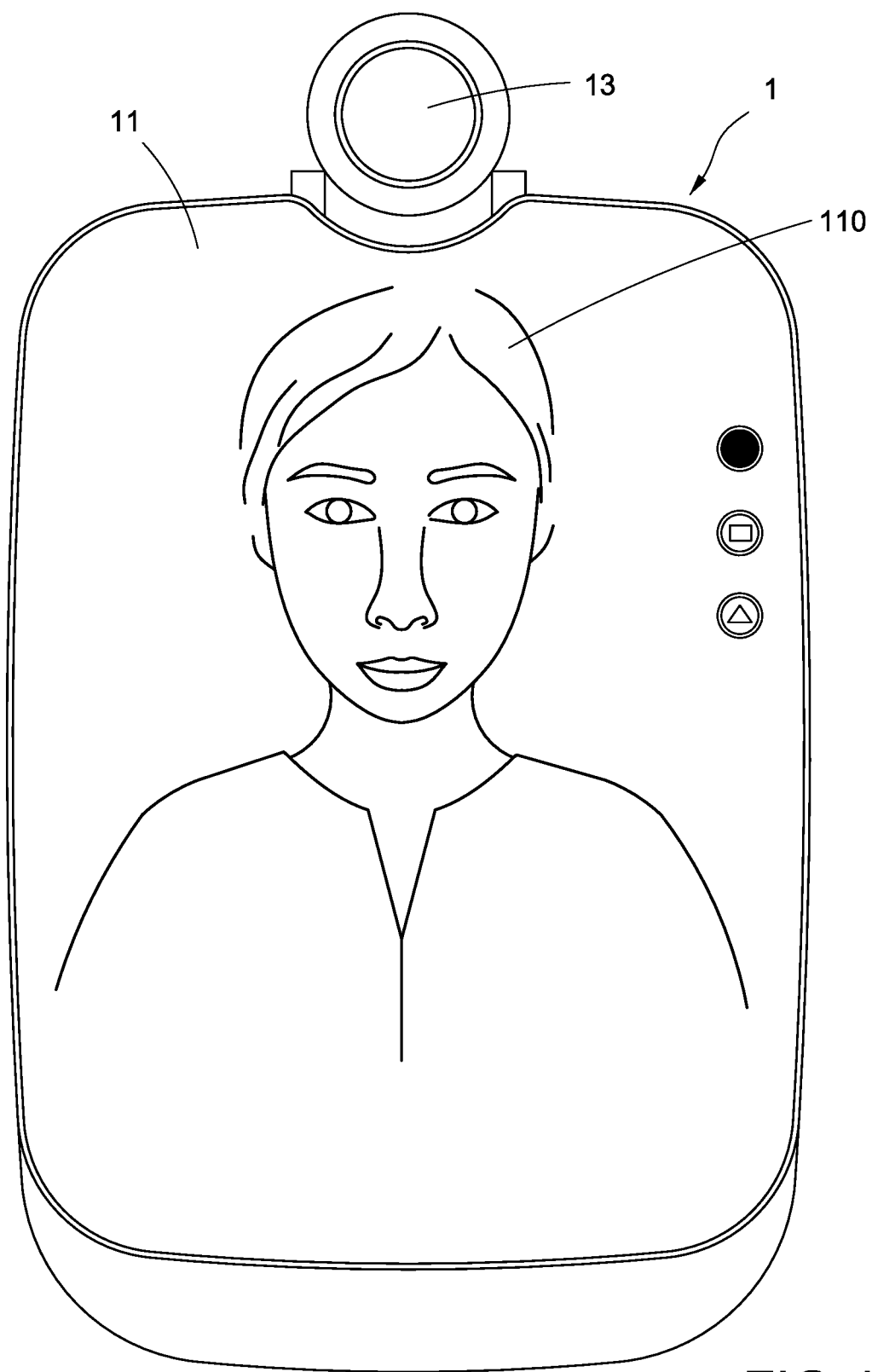
FIG. 4 is a schematic view showing the make-up interface according to the first example.

At first, as shown in FIG. 4, when the user sits in front of the make-up assisting device 1 and the make-up assisting device 1 is in make-up assisting mode, the make-up assisting device 1 uses the reflecting mirror 11 to reflect a face image 110 of the user such that the user may put on her make-up with the help of the reflecting mirror 11.

As shown in FIG. 5, according to an example, the processor 10 may control the display unit 12 to display the first assisting interface 121 on one portion thereof, fetch the video content information 162 from the storage unit 16, and display the video content information 162 on the first assisting interface 121. As mentioned above, the video content information 162 may be static image of a specific make-up appearance (such as the lip make-up appearance shown in FIG. 5), the required cosmetic, related video and so on. The user may clearly preview the finished make-up appearance through the first assisting interface 121 to facilitate the make-up procedure for the user.

Figure 6:
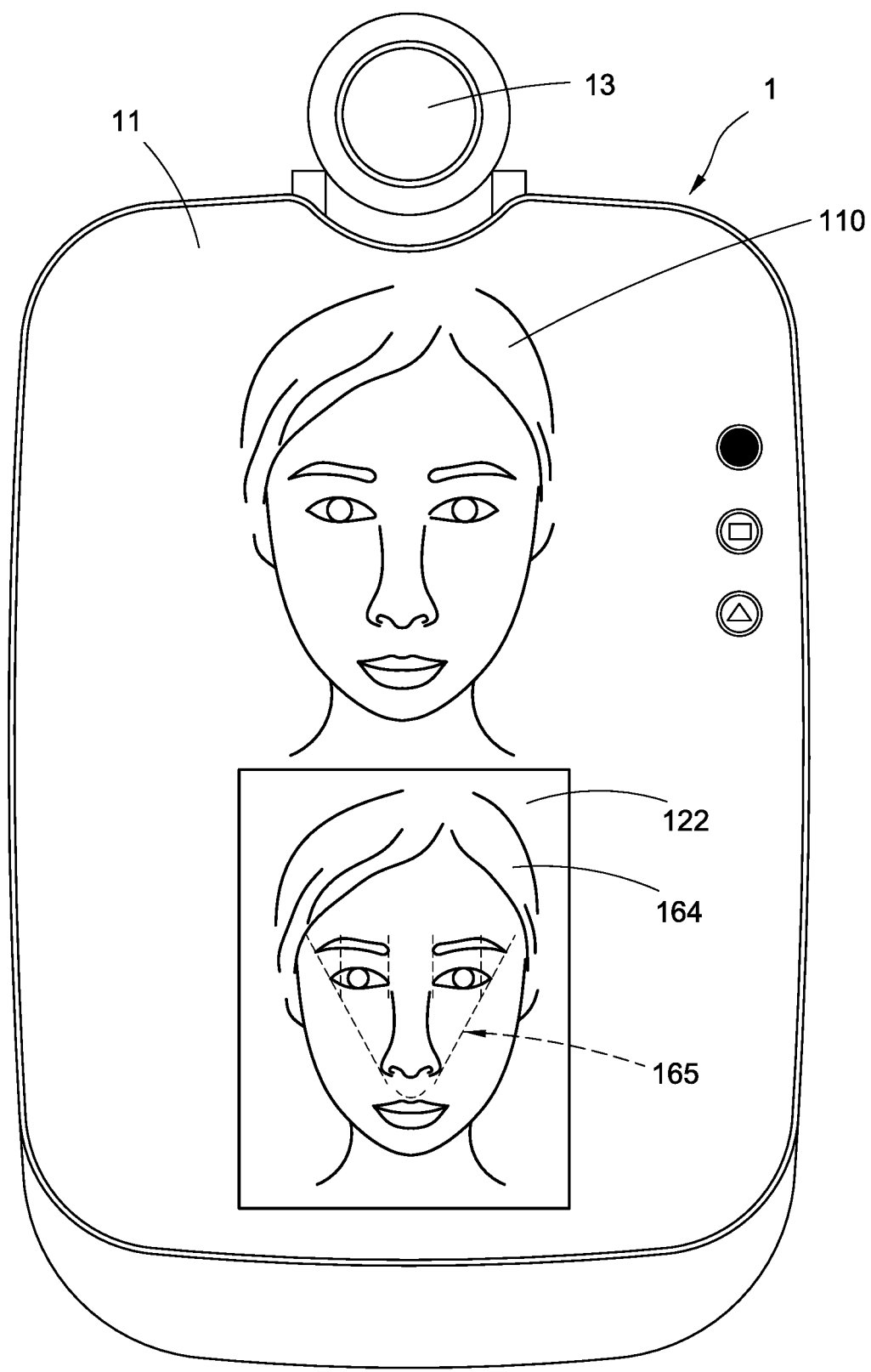
FIG. 6 is a schematic view showing the make-up interface according to the third example.

As shown in FIG. 6, according to one example, the processor 10 may control the display unit 12 to display the second assisting interface 122 on a portion thereof. As mentioned above, the processor 10 may read the face photo 164 and a set of make-up assisting lines 165 from the storage unit 16 (or directly read the integrated or merged auxiliary photo) and display the display the face photo 164 and a set of make-up assisting lines 165 on the second assisting interface 122. Alternatively, the processor 10 may fetch the face photo 164 of the user in real time and analyzes the face photo 164 of the user in real time to generate one or more set of make-up assisting lines 165, and then display the face photo 164 and the make-up assisting lines 165 in overlapped manner on the second assisting interface 122. Through the second assisting interface 122, the user can clear watch the position of the make-up region to facilitate her/his make-up process.

It should be noted that, depending on actual need of the user, the processor 10 may display one set of make-up assisting lines 165 corresponding to one make-up region on the second assisting interface 122, or display multiple sets of make-up assisting lines 165 respectively corresponding to multiple make-up regions on the second assisting interface 122.

Figure 7:
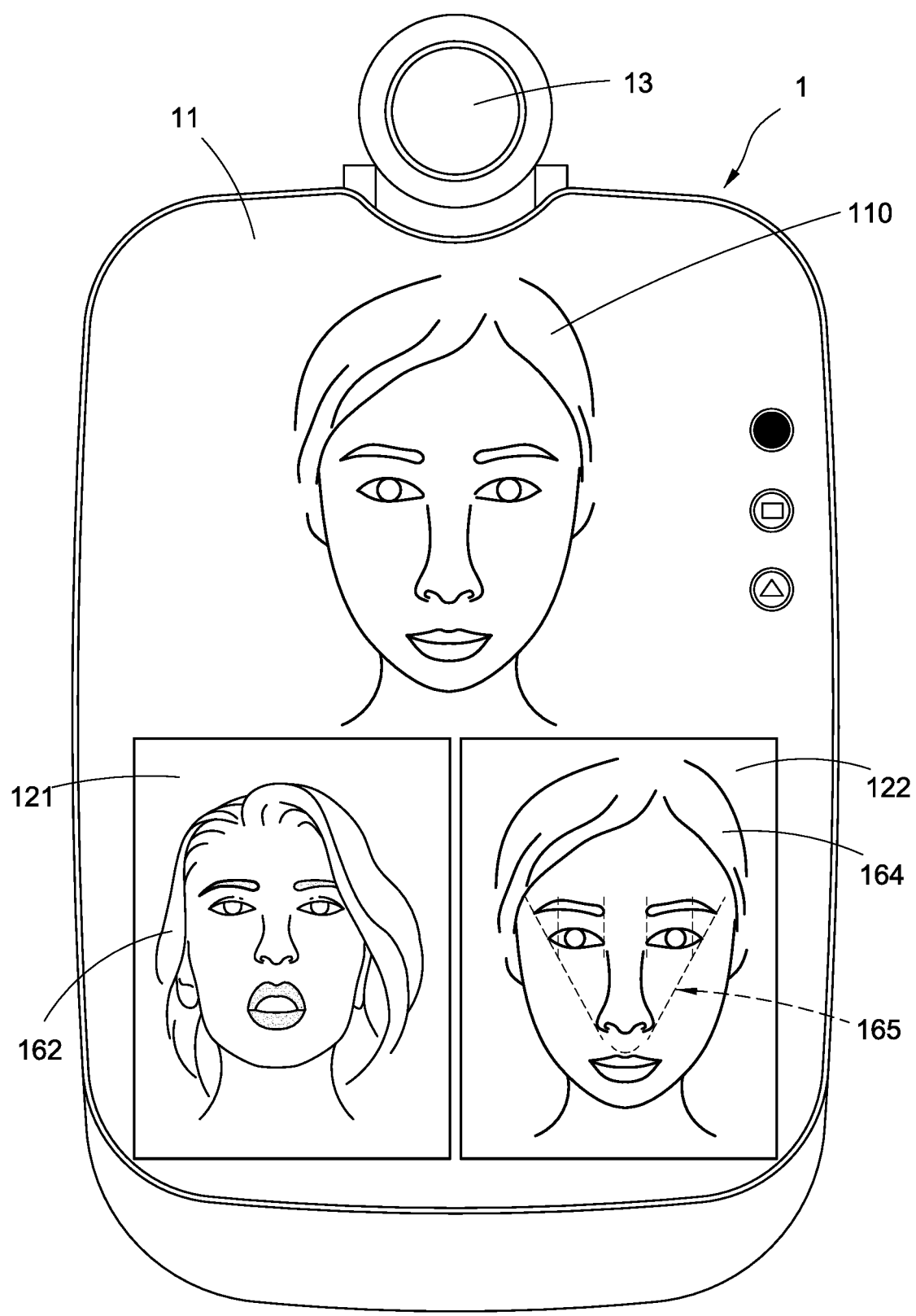
FIG. 7 is a schematic view showing the make-up interface according to the fourth example.

As shown in FIG. 7, in one example, the processor 10 may control the display unit 12 to display the first assisting interface 121 and the second assisting interface 122 at the same time. Besides, the first assisting interface 121, the second assisting interface 122 and the face image reflected by the reflecting mirror 11 do not overlap with each other. Therefore, the make-up assisting method provides user with multiple make-up assisting information through the make-up assisting device 1 to provide satisfactory user experience.

In the example shown in FIG. 7, the first assisting interface 121 and the second assisting interface 122 are displayed. In other example, the processor 10 may control the display unit 12 to display three or more assisting interfaces at the same time, which is not limited by the example shown in FIG. 7.

As shown in FIGS. 4 to 7, in the above make-up assisting mode, the make-up assisting device 1 may further provide a plurality of key functions through which the user may operate the input unit 14 or the touch panel to execute functions such as starting recording, stopping recording, uploading video, deleting video and storing video and so on. This helps the production and arrangement of the recorded video for user.

Figure 8:
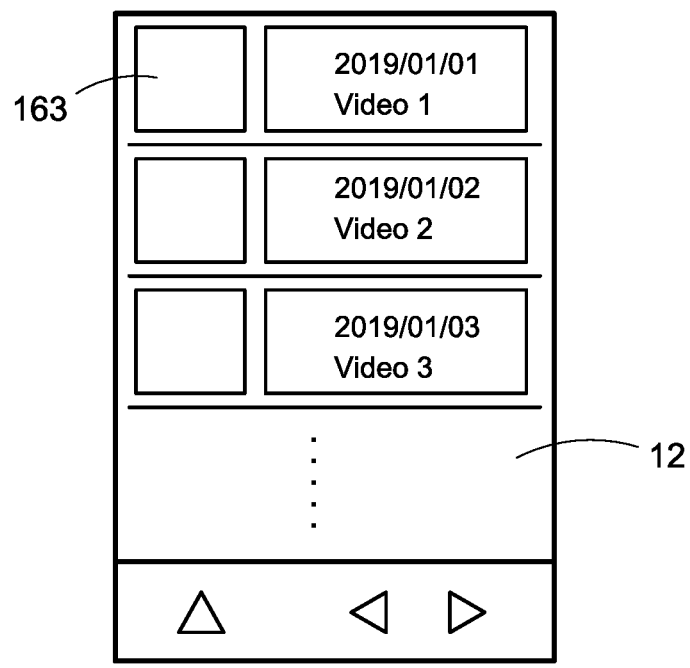
FIG. 8 is a schematic view of playing back interface according to the first example.
Figure 9:
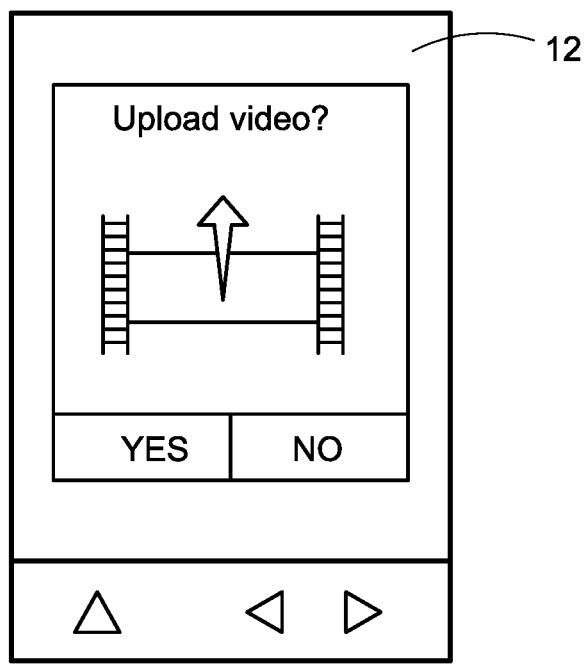
FIG. 9 is a schematic view of uploading interface according to the first example.

Refer to FIGS. 8 and 9, where FIG. 8 shows the schematic view of uploading interface according to the first example, and FIG. 9 shows the schematic view of updating make-up assisting lines according to the first example.

As shown in FIG. 8, the display unit 12 further provides a video management interface. The processor 10 controls the display unit 12 to show all of the recorded video 163 of the user on the video management interface, and the user may use the video management interface to arrange, edit (such as name, set tag, make remark), classify and delete the recorded video 163.

As shown in FIG. 9, the user may upload the recorded video 163 by the video management interface to share the recorded video 163 with others. Therefore, the user may use the recorded video 163 to provide make-up instruction for others or get recommendation from others.

In one example, the make-up assisting device 1 may receive the upload operation from the user and send the recorded video 163 to the social platform, such as but not limited to, FACEBOOK, Instagram, Twitter, YouTube, and Weibo through the wireless transmission unit 15. In another example, the make-up assisting device 1 may provide an additional cloud platform (not shown) and the user may upload the recorded video 163 to the cloud platform such that the users of the make-up assisting device 1 may exchange their experience.

Figure 10:
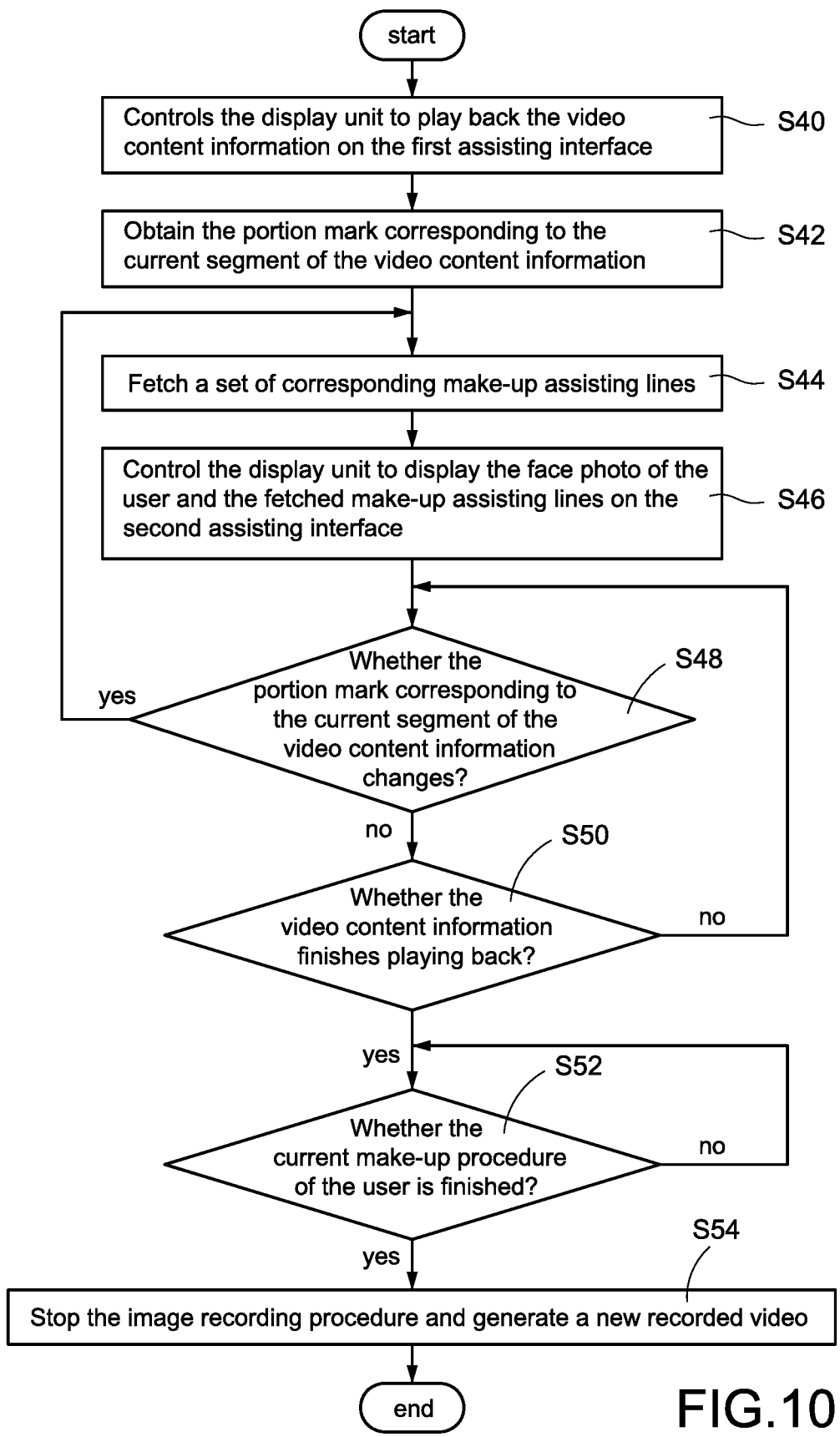
FIG. 10 shows the flowchart for updating the make-up assisting lines according to a first example of the disclosure.

FIG. 10 shows the flowchart for updating the make-up assisting lines according to a first example of the disclosure. The flowchart in FIG. 10 demonstrates how the make-up assisting device 1 of the disclosure automatically changes the make-up assisting lines 165 displayed on the second assisting interface 122 based on the video content information 162 displayed on the first assisting interface 121.

In this example, the video content information 162 played back on the first assisting interface 121 of the make-up assisting device 1 is video. The video comprises a plurality of segments, where each of the segments corresponds to the instruction or introduction for different make-up regions. Besides, each of the segments in the video is assigned with a portion mark; each of the portion marks indicates a make-up region introduced by each segment.

For example, if a video contains three segments for eyebrow make-up instruction, cheek make-up instruction and lip make-up instruction, then the processor 10, the user or the video provider may set a corresponding portion mark for each of the three segments, such as portion mark for eyebrow make-up region, cheek make-up region and lip make-up region.

In the example shown in FIG. 10, the processor 10 controls the display unit 12 to play back the video content information 162 on the first assisting interface 121 (step S40). In this example, the video content information 162 is instruction video or introduction video. Afterward, the processor 10 performs detection to the video content information 162 to obtain the portion mark corresponding to the current segment of the video content information 162 (step S42).

After step S42, the processor 10 enquires the storage unit 16 with the obtained portion mark to fetch a set of corresponding make-up assisting lines 165 from the storage unit 16 (step S44). Afterward, the processor 10 controls the display unit 12 to display the face photo 164 of the user on the second assisting interface 122 and display the fetched make-up assisting lines 165 on the face photo 164 (step S46).

For example, if the current segment of the video content information 162 is for the introduction for the eyebrow make-up (namely the content of the corresponding portion mark is eyebrow make-up region), then the processor 10 enquires the storage unit 16 based on the portion mark to fetch the make-up assisting lines 165 corresponding to the eyebrow make-up region. Therefore, the processor 10 may display the make-up assisting lines 165 corresponding to the eyebrow make-up region on the face photo 164 displayed on the second assisting interface 122 to facilitate the make-up of eyebrow for the user.

In this example, the processor 10 continually detects the video content information 162 played back on the first assisting interface 121 and continually determine whether the portion mark corresponding to the current segment of the video content information 162 changes (step S48). The processor 10 does not actively change the currently used and displayed make-up assisting lines 165 if the portion mark fetched by the processor 10 does not change.

If the portion mark fetched by the processor 10 changes, it means the make-up region corresponding to the instruction content or introduction content of the video content information 162 changes. Under this situation, the processor 10 may re-execute steps S44 and S46 based on the changed portion mark to re-fetch the make-up assisting lines 165 (step S44) and display the re-fetched make-up assisting lines 165 on the face photo 164 displayed on the second assisting interface 122 (step S46). More particularly, the processor 10 mainly re-enquires the storage unit 16 based on the changed portion mark and reads another set of make-up assisting lines 165 corresponding the changed make-up region from the storage unit 16.

In another example, the face photo 164 and the multiple sets of make-up assisting lines 165 are merged (integrated) into a plurality of auxiliary photos. In this example, the processor 10 mainly re-enquires the storage unit 16 based on the changed portion mark and reads another auxiliary photo corresponding to the changed make-up region from the storage unit 16. The processor 10 then displays the auxiliary photo on the second assisting interface 122.

In this example, the processor 10 continually detects whether the video content information 162 finishes playing back (step S50) and continually detects the played back content of the video content information 162 before the video content information 162 finishes playing back, thus determine whether the portion mark changes.

If the processor 10 determines that the video content information 162 finishes playing back in the step S50, then the processor 10 further determines whether the current make-up procedure of the user is finished (step S52). If the current make-up procedure of the user is not finished, the processor 10 still waits even the video content information 162 finishes playing back. On the contrary, if the current make-up procedure of the user is finished, the processor 10 controls the image capturing unit 13 to stop the image recording procedure and generate a new recorded video 163 based on the recorded image, and stores the new recorded video 163 in the storage unit 16 (step S54).

By the technique scheme of the present disclosure, the user may obtain the image and one or more assisting information on the reflecting mirror 11/display unit 12 of the make-up assisting device 1. The speed and accuracy of the make-up procedure can be enhanced.

Although the present disclosure has been described with reference to the exemplary example thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A make-up assisting method implemented by a make-up assisting device (1), the make-up assisting device (1) comprising at least a reflecting mirror (11), an image capturing unit (13), a display unit (12) arranged behind the reflecting mirror (11) and a processor (10) electrically connected to the image capturing unit (13) and the display unit (12), the make-up assisting method comprising:

a) the reflecting mirror (11) directly reflecting a face image (10) of a user when the make-up assisting device (1) enters a make-up assisting mode;

b) the processor (10) obtaining a video content information (162) from a storage unit (16), wherein the storage unit (16) has a plurality of pre-stored videos (161), each of the pre-stored videos (161) has a content mark, and the processor (10) is to obtain the content mark corresponding to one of the pre-stored videos (161) and reads the video content information (162) from the storage unit (16) based on the content mark;

c) the display unit (12) providing a first assisting interface (121) on a portion of the display unit (12) and the processor (10) controlling the display unit (12) to display the video content information (162) on the first assisting interface (121), wherein the first assisting interface (121) does not overlap with the face image (110);

d01) the processor (10) obtaining a face photo (164) for the user after the make-up assisting device (1) enters the make-up assisting mode;

d02) the display unit (12) providing a second assisting interface (122) on another portion of the display unit (12) and the processor (10) controlling the display unit (12) to display the face photo (164) on the second assisting interface (121), wherein the first assisting interface (121) does not overlap with second assisting interface (122);

d03) the processor (10) fetching at least one set of make-up assisting lines (165), wherein the set of make-up assisting lines (165) are corresponding to a make-up region on the face of the user; and d04) the processor (10) controlling the display unit (12) to display the make-up assisting lines (165) on the face photo (164).

2. The method in claim 1, wherein in the step b), the processor (10) obtains the content mark corresponding to a last played-back pre-stored video (161) before the make-up assisting device (1) enters the make-up assisting mode.

3. The method claim 1, wherein the video content information (162) comprises at least a static image for a make-up appearance introduced by the pre-stored video (161).

4. The method in claim 1, wherein the storage unit (16) pre-stores the face photo (164), the processor (10) performs image analysis to the face photo (164) for generating the make-up assisting lines (165) and stores the make-up assisting lines (165); wherein the plurality sets of the make-up assisting lines (165) are corresponding to multiple make-up regions on the face photo (164); in the step d01), the processor (10) obtaining the face photo (164) from the storage unit (16).

5. The method in claim 1, wherein in the step d01), the processor (10) controls the image capturing unit (13) to capture user image to generate the face photo (164) in real time; and in the step d03), the processor (10) performs image analysis to the face photo (164) to generate the at least one set of make-up assisting lines (165) in real time.

6. The method in claim 1, wherein storage unit (16) pre-stores the plurality sets of the make-up assisting lines (165), the plurality sets of the make-up assisting lines (165) are corresponding to multiple make-up regions on the face of the user; in the step d03), the processor (10) receives operation from the user to select one of the plurality sets of the make-up assisting lines (165).

7. The method in claim 1, wherein storage unit (16) pre-stores the plurality sets of the make-up assisting lines (165), the plurality sets of the make-up assisting lines (165) are corresponding to multiple make-up regions on the face of the user; the video content information (162) comprises a portion mark indicating to one of the make-up regions; in the step d03), the processor (10) reads the portion mark corresponding to the video content information (162) currently displayed on the first assisting interface (121) and reads one set of the make-up assisting lines (165) in the storage unit (16) based on the portion mark.

8. The method in claim 7, further comprising following steps after the step d04):
- d05) the processor (10) determining whether the set of the make-up assisting lines (165) need change;
- d06) the processor (10) reads another set of the make-up assisting lines (165) in the storage unit (16) when the processor (10) determining that the set of the make-up assisting lines (165) need change, wherein the another set of the make-up assisting lines (165) are corresponding to another make-up region on the face of the user; and
- d07) the processor (10) controlling the display unit (12) to display the another set of the make-up assisting lines (165) on the face photo (164).

9. The method in claim 8, wherein in the step d06), the processor (10) determines that the set of the make-up assisting lines (165) need change when the processor (10) receives a change operation from the user.

10. The method in claim 8, wherein the video content information (162) comprises a video having a plurality of segments, each of the segments in the video is set with one of the portion marks, each of the portion marks indicates a make-up region introduced by one of the segments; in the step c) the processor (10) controls the display unit (12) to play back the video on the first assisting interface (121); in the step d05) the processor (10) continually detects the portion mark corresponding to the current segment of the video; in the step d06) the processor (10) determines that the set of the make-up assisting lines (165) need change when the portion mark corresponding to the segment of the video changes.

11. The method in claim 10, wherein in the step d06), the processor (10) reads the another set of the make-up assisting lines (165) in the storage unit (16) based on the changed portion mark.

12. The method in claim 1, further comprising:
- a1) the processor (10) controlling the image capturing unit (13) to execute an image recording procedure toward the user when the make-up assisting device (1) enters the make-up assisting mode; and
- a2) stopping the image recording procedure and generating a recorded video (163) when a make-up procedure of the user finishes.

13. The method in claim 12, wherein the make-up assisting device (1) provides a cloud platform, the method further comprises a step d):
- the processor (10) receives an upload operation from user and upload the recorded video (163) to the cloud platform.

\* \* \* \* \*